Aug. 24, 1948. A. THOMAS 2,447,921
PARACHUTE SHROUD LINK
Filed March 22, 1946
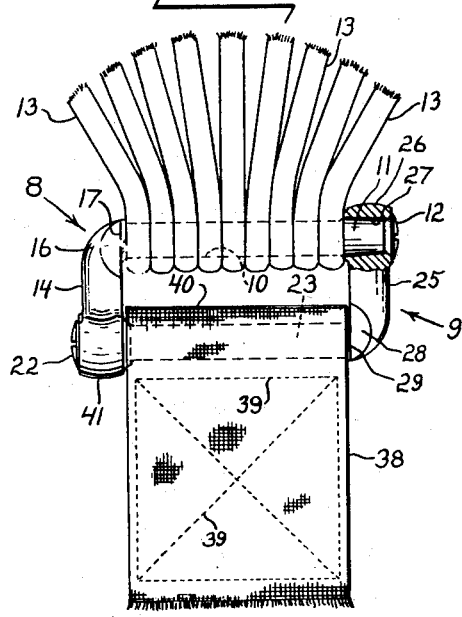
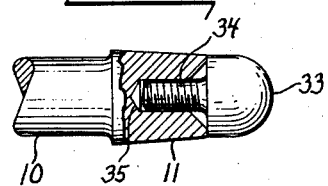
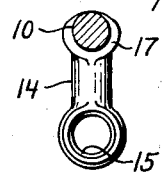
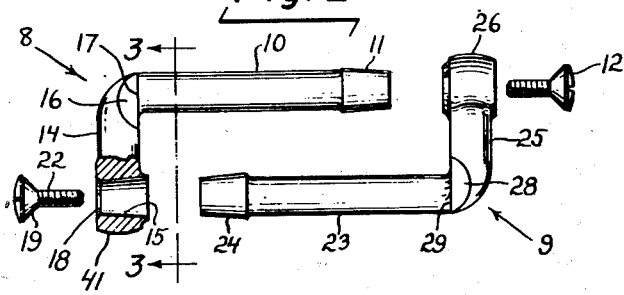
Inventor
ALBERT THOMAS
By Strauch + Hoffman
Attorneys Patented Aug. 24, 1948

2,447,921

UNITED STATES PATENT OFFICE 2,447,921

PARACHUTE SHROUD LINK

Albert Thomas, Munhall, Pa.

Application March 22, 1946, Serial No. 656,496

1 Claim. (Cl. 24—265)

This invention relates to devices for detachably linking together two elements such as the riser straps or lift webs and the shroud lines of a parachute.

The conventional parachute includes a harness which is strapped onto and around the body of the wearer so as to secure him within it. The harness includes, or may be said to terminate in members which are generally called riser straps, lift webs, or suspension straps, and which, when the wearer is descending through the air suspended by the parachute, extend vertically to a point where they terminate and are joined to the lower ends of the parachute shroud lines by metallic links or D rings. These links or rings are of one piece construction, the ends of the riser straps being passed through the link and looped back, the overlapping portions being securely sewed together. The shroud lines are secured to the other portion of the link in a similar manner, being passed through the link, knotted and sewed. The connection of the riser straps to the shroud lines is thus a tedious operation and after it is made they are inseparable, except by ripping of the sewed stitches.

It is necessary that the parachute canopy be unpacked at intervals for inspection and airing, and it must also be unpacked and dried out if it has become wet or damp. With the present type of one piece links or couplers the harness cannot be detached from the shroud lines of the canopy, and the entire parachute including the harness must be taken out of service during the time the canopy is being aired or dried.

I have provided a two piece separable link for the purpose of detachably joining the riser straps to the shroud lines. When my novel link is used the loops in the ends of the riser straps and the loops at the bottoms of the shroud lines may be stitched before they are secured to the link. It is considerably easier to stitch the loops in this manner than when already assembled on the link. After the aforesaid stitching, the separable parts of the link are slipped into the loops and secured together to complete the connection of the shroud lines to the riser straps. My separable link is only slightly larger and heavier than a solid link of the same strength.

While the separable link of my invention is so designed as to be absolutely foolproof and will not fail under the extreme loads to which it is subjected when the parachute first opens, it can be readily and easily disassembled in order to detach the shroud lines of the canopy from the riser straps for the purposes previously described.

My separable link comprises two identical parts that have an interfitting relationship with each other such that they will not come apart when tension forces are applied between the shroud lines and riser straps. The two parts are further secured together by a pair of identical screws which prevent the separation of the parts although the screws are subjected to substantially none of the tension forces because of the design of the interfitting relationship of the two identical link parts, which design does not permit of any play between the two parts when assembled, whether the screws are in place or not. The shape of the two identical parts of the link is such as to lend to their manufacture by forging. The parts of the link are also shaped to prevent the link being cocked at an angle between the shroud lines and the riser straps as by the slipping of either the shroud lines or riser straps around the link.

It is therefore a primary object of my invention to provide a separable link between the shroud lines and riser strap of a parachute and its harness to permit the easier connection between these two elements and also to permit their disconnection.

It is another important object to provide a link of the type described which is so shaped as to prevent it being cocked from its normal position between the shroud lines and riser straps.

Another important object is the provision of a novel separable link adapted to separably connect two elements of a harness or the like equipment.

Another object is the provision of a novel separable connecting link between two elements of a harness or the like equipment wherein tension loads between the two elements are borne substantially wholly by the two parts of the separable link which are so interfitted as to absorb substantially all of the load themselves.

Another important object is the provision of a novel separable link comprising two identical parts of such shape that they may be forged, resulting in a detachable link structure of great strength and low cost.

Yet another important object is the provision of a separable link comprising a pair of similar interfitting parts so shaped that when assembled there is no play between the assembled parts.

Other objects will become apparent as the description proceeds in connection with the accompanying drawings, wherein:

Figure 1 is a view of a preferred form of a link constructed in accordance with my invention, shown assembled with the riser straps and shroud lines in place.

Figure 2 is an exploded view of the elements of the link shown in Figure 1, illustrating the similarity of the parts and the ease with which they may be assembled.

Figure 3 is a sectional view substantially along the line 3—3 of Figure 2.

Figure 4 is a partial view showing the application of a rounded mandrel or nose to one of the parts of the link to facilitate the slipping of the shroud lines or the riser straps onto its respective portion of the link.

As shown in Figures 1 and 2 the separable link comprises two similar L shaped elements designated generally by the reference numbers 8 and 9. Element 8 has a long leg 10 terminating at its end in a slightly enlarged and tapered male portion 11 which is drilled and tapped axially to receive a screw 12. The leg 10 is substantially cylindrical for insertion into loops in the ends of the shroud lines 13 as shown in Figure 1. The other leg 14 extends substantially at right angles to the leg 10, and is substantially shorter than leg 10 as shown. At its end portion the short leg 14 is enlarged and provided with a tapered bore 15 which is parallel to the axis of the long leg 10 and the tapered male portion 11 thereon. The dimensions of the bore 15 and its angle of taper, etc., are the same as those of the male portion 11 although the slope of the taper is in the opposite direction from that of the male portion 11 for a purpose to be described.

At the juncture of the long leg 10 and the short leg 14 there is provided an enlargement 16 which provides a radial flange 17 (shown also in Figure 3) at the left end of the long leg 10. The enlargement 16 and radial flange 17 form a stop or abutment at the end of the long leg 10, the stop being larger than the diameter of the long leg 10, and preventing the shroud lines 13 from slipping off of the long leg 10 and around the bend onto the short leg 14. The smaller end of the tapered bore is slightly countersunk at 18 to receive the mating conical underside 19 of the head on a machine screw 22.

The L shaped element 9 is identical in shape and dimensions with the element 8, having a long leg 23 with a tapered male portion 24, a short leg 25 having an enlargement 26 with a tapered bore 27 therein, and an enlargement 28 at the juncture of the short and long legs to form a radial flange 29 having the same purpose as the enlargement and flange 16 and 17.

As shown in Figure 1 the loops at the ends of the shroud lines 13 are slipped over the long leg 10 of the element 8. In order to facilitate this operation and to prevent the chafing of the shroud lines on the end of the tapered male portion 10, a rounded mandrel or noze 33 (Figure 4) having a threaded part 34 is screwed into the tapped hole 35 in the male portion. The largest diameter of the mandrel 33 is such that it prevents the loops on the shroud lines from engaging the corner at the end of the male portion, as will be apparent, and after the loops have all been slipped onto the long leg 8 the mandrel is removed.

The upper end of a riser strap 38 is doubled back upon itself and stitched at 39 to form a loop 40 at its end, is shown in Figure 1. The mandrel 33 is used on the male portion 24 of the element 9 when placing the loop 40 onto the long leg 23 as previously described in connection with the shroud lines 13.

After the riser strap 38 and the shoud lines 13 are in place as described the two elements 8 and 9 are assembled by simultaneously slipping the tapered male portions 11 and 24 into the tapered bores 27 and 15. The elements 8 and 9 are pressed together so that the respective male portions are wedged into the tapered bores. It is apparent that in this condition the two elements 8 and 9 are well secured together due to this wedging action, and that forces applied perpendicular to the long legs 10 and 23, or even at a substantial angle to them, cannot pull the separable elements apart. This is due to the arrangement of the interfitting parts of the two links and the slight degree of taper of the male portions 11 and 24 and the bores 15 and 27, which taper is exaggerated in the drawings for purpose of illustration, the actual taper being in the order of approximately three-fourths of an inch per foot.

The assembled link is positively held together, however, by the screws 12 and 22 which are now inserted and screwed up tightly. Separation of the link is accomplished simply and quickly by removing the screws 12 and 22 and pulling the elements 8 and 9 apart. A slight tapping of the elements may be necessary in order to loosen the tapered parts which are wedged together.

My separable link therefor provides a quickly separable connection between the riser straps and the shroud lines, of such design that it is as strong as a solid link. Because it is separable, the loops in the ends of the riser straps and shroud lines may be made and sewed before they are assembled onto the link, which is a distinct advantage. Neither the shroud lines nor the riser can slip around the corners of the assembled link since this action is prevented by the flanges 17 and 29 and by the enlargements 26 and 41 which contain the tapered bores. Cocking of the link between the shroud lines and riser straps is thus prevented. The cost of manufacture of the link is kept at a minimum by reason of the fact that the elements are identical, and that any two elements, when assembled, form a link.

While I have illustrated my invention as applied to the joining of the shroud lines to the riser straps, it is to be understood that it may be used in any part of the parachute where a separable link is desirable, and it is also intended for use in any environment other than in a parachute, where a separable connection between two elements is used.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A detachable link for connecting the shroud lines of a parchute to the harness, comprising a substantially identical pair of rigid angular elements each having a short leg and a long leg substantially at right angles to each other, the short leg of each element having a slightly tapered elongated bore adjacent its end and parallel to the long leg of the element, the end portion of the long leg of each element being also tapered slightly along an enlongated section at the same angle and having the same dimensions as the tapered bore, said tapered bores and end portions being sloped in a direction so that said elements are adapted to be assembled with the tapered end portion of each long leg extending into and securely wedged into the tapered bore of each short leg, the said tapered portions extending substantially through the said tapered bores but terminating within said bores and adjacent the smaller ends thereof, and a headed screw, threaded axially into the end of each said long leg with its head engaging the bored end of the mating short leg adjacent the smaller end of the bore therethrough, to maintain the wedged engagement of the long legs within their respective tapered bores.

ALBERT THOMAS.

REFERENCES CITED

The following references are of record in the file of this patent:

UNITED STATES PATENTS

| Number | Name | Date |
| --- | --- | --- |
| 1,538,648 | Noble | May 19, 1925 |
| 1,565,392 | Powers | Dec. 15, 1925 |
| 1,852,321 | Leighton | Apr. 5, 1932 |
| 2,049,024 | Robertson | July 28, 1936 |